US008041333B2

(12) United States Patent
Hansen et al.

(10) Patent No.: US 8,041,333 B2
(45) Date of Patent: Oct. 18, 2011

(54) METHOD AND SYSTEM FOR 60 GHZ ANTENNA ADAPTATION AND USER COORDINATION BASED ON BASE STATION BEACONS

(75) Inventors: Christopher J. Hansen, Sunnyvale, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 943 days.

(21) Appl. No.: 11/935,105

(22) Filed: Nov. 5, 2007

(65) Prior Publication Data

US 2008/0311944 A1 Dec. 18, 2008

Related U.S. Application Data

(60) Provisional application No. 60/944,011, filed on Jun. 14, 2007.

(51) Int. Cl.
*H04M 11/04* (2006.01)

(52) U.S. Cl. ............ 455/404.2; 455/517; 455/440; 455/63.4; 455/456.1; 455/562.1; 370/329; 342/357

(58) Field of Classification Search .............. 455/517, 455/3.01, 3.04, 3.05, 3.06, 411, 420, 428, 455/436, 450, 451, 452.1, 452.2, 454, 456.1, 455/464, 13.3, 15, 41.2, 63.4, 67.15, 703, 455/552.1, 553.1, 66.1, 101, 426.2, 422.1, 455/426.1, 554.1, 68, 63.3, 67.16, 440, 441, 455/67.11, 404.2, 414.2, 457; 370/338, 329; 340/426.19; 342/417
See application file for complete search history.

(56) References Cited

U.S. PATENT DOCUMENTS

| 6,061,026 | A  | * | 5/2000  | Ochi et al. .............. 343/700 MS |
| 6,574,794 | B1 | * | 6/2003  | Sarraf ............................ 725/63 |
| 7,142,812 | B1 | * | 11/2006 | Brankovic et al. ........... 455/41.2 |
| 7,912,449 | B2 | * | 3/2011  | Hansen et al. ............. 455/404.2 |
| 2003/0027586 | A1 | * | 2/2003 | Johnson et al. .............. 455/517 |
| 2004/0023652 | A1 | * | 2/2004 | Shah et al. ................. 455/426.2 |
| 2004/0217948 | A1 | * | 11/2004 | Kawasaki et al. ............. 345/204 |
| 2006/0160489 | A1 | * | 7/2006 | Hardacker ................... 455/66.1 |
| 2006/0190803 | A1 | * | 8/2006 | Kawasaki et al. ............. 714/821 |
| 2007/0021121 | A1 | * | 1/2007 | Lane et al. .................... 455/441 |
| 2008/0002652 | A1 | * | 1/2008 | Gupta et al. .................. 370/338 |
| 2008/0130561 | A1 | * | 6/2008 | Shao et al. ................... 370/329 |
| 2008/0210264 | A1 | * | 9/2008 | Bochud et al. .................. 134/33 |
| 2008/0311851 | A1 | * | 12/2008 | Hansen et al. ............... 455/41.2 |
| 2009/0041149 | A1 | * | 2/2009 | Sarris et al. .................. 375/267 |
| 2010/0046450 | A1 | * | 2/2010 | Seyedi-Esfahani et al. .. 370/329 |
| 2010/0070672 | A1 | * | 3/2010 | Unger .......................... 710/310 |
| 2010/0135238 | A1 | * | 6/2010 | Sadri et al. ................... 370/329 |
| 2010/0178884 | A1 | * | 7/2010 | Nassiri-Toussi et al. ..... 455/101 |

* cited by examiner

*Primary Examiner* — Tan Trinh

(74) *Attorney, Agent, or Firm* — McAndrews, Held & Malloy, Ltd.

(57) ABSTRACT

Information may be communicated between two or more wireless devices via adaptive or steered antennas or antenna systems and 60 GHz signals. The adaptive or steered antennas or antenna systems may be initialized based upon location information determined from a beacon signal and/or a reference system. The beacon signal may be swept through an angle and may be utilized along with reference system information to determine the direction and/or distance between the two or more wireless devices. Spatial relationships between the two or more wireless devices may vary. The two or more wireless devices may communicate and coordinate communications between them via alternate lower frequency signals.

25 Claims, 6 Drawing Sheets

__US 8,041,333 B2__

METHOD AND SYSTEM FOR 60 GHZ ANTENNA ADAPTATION AND USER COORDINATION BASED ON BASE STATION BEACONS

CROSS-REFERENCE TO RELATED APPLICATIONS/INCORPORATION BY REFERENCE

This application makes reference to and claims priority to U.S. Provisional Application Ser. No. 60/944,011, filed on Jun. 14, 2007, which is hereby incorporated herein by reference in its entirety.

FIELD OF THE INVENTION

Certain embodiments of the invention relate to wireless communication. More specifically, certain embodiments of the invention relate to a method and system for 60 GHz antenna adaptation and user coordination based on base station beacons.

BACKGROUND OF THE INVENTION

The field of wireless communication has seen dramatic growth the last few years. In today's world, most people use their mobile devices, be it cellular phones, PDA's, laptops, media players and/or other devices for business and personal use on a constant and daily basis. Often multiple users within a local environment operate on a plurality of wireless interfaces. In addition to voice and data communication such as email and internet browsing, these devices may enable high speed data transfer such as video streaming or multi-user gaming wherein multiple users interact with one or more video display applications. Wireless service providers may offer links via various wireless technologies such as GSM, CDMA or WIMAX for wide area communications while links utilized within a local region or interior space may comprise technologies such as wireless local area networks (WLAN) and wireless personal area networks (WPAN).

Many service providers offer location based services for hand held wireless devices. These location based services may utilize satellite reference systems such as the Global Positioning system (GPS). The GPS system comprises 24 medium orbit satellites that enable devices comprising GPS receivers to determine position and time. The devices may calculate their position by measuring their distance from three or more GPS satellites. In some instances, the GPS system may be utilized as a clock reference for a plurality of devices that depend on a known time reference.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 60 GHz antenna adaptation and user coordination based on base station beacons, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
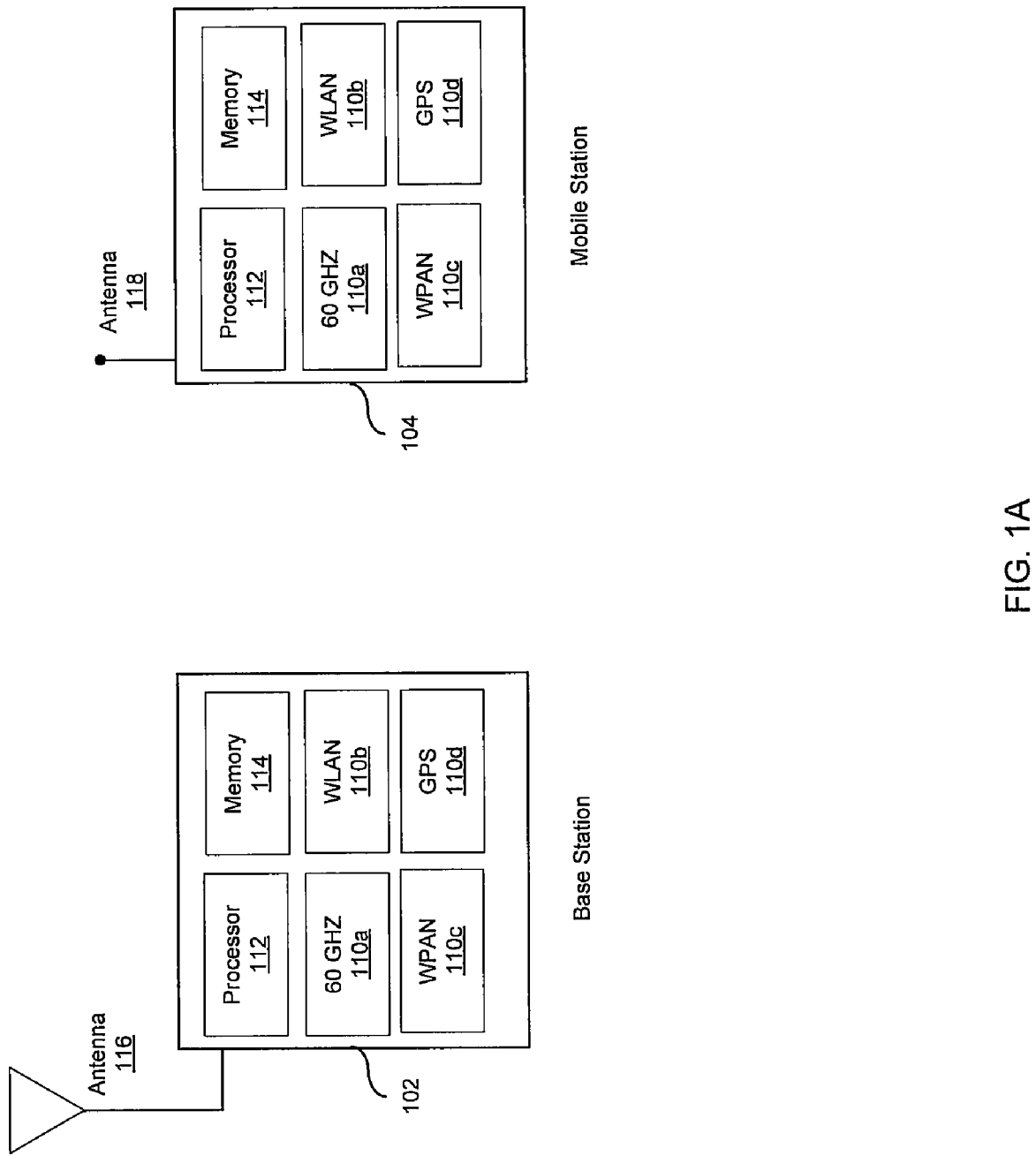
FIG. 1A is a block diagram that illustrates an exemplary system for 60 GHz antenna adaptation and user coordination based on base station beacons, in accordance with an embodiment of the invention.

Certain aspects of the invention may be found in a method and system for 60 GHz antenna adaptation and user coordination based on base station beacons. Various aspects of the invention may enable communication between two or more wireless devices via a 60 GHz wireless link. In this regard, 60 GHz transmissions may utilize any available unlicensed millimeter wave frequency band within the range of 57 to 66 GHz. Due to the characteristics of radio wave propagation at extremely high frequencies, 60 GHz wireless links may be best utilized for communication over short distances and may be transmitted in highly directional beams. Accordingly, a pair of antennas enabled for communication at 60 GHz in transmitting and receiving link partners, may need to be precisely aligned in order to maintain communication. Adaptive antennas may be utilized to maintain such an alignment between two 60 GHz link partners during transmissions. However, determining the initial alignment via adaptive antenna signal processing may be time consuming. Therefore, various location determination techniques may be utilized to aid in the initial alignment of antennas utilized in 60 GHz communications. For example, a beacon signal may be transmitted from a base station to aid in location determination of one or more mobile devices. The beacon may be transmitted via a directional radiation pattern that may be swept through an angle over azimuth or altitude for example. The base station and mobile stations may utilize angle and/or distance measurements based on the beacon to locate the mobile stations and map their positions.

In some embodiments of the invention, the location determination process may be aided by global positioning system (GPS) data, a terrestrial reference system, and/or a compass for position and/or time references. The base station and mobile stations may share location determination information in order to enable 60 GHz transmissions via adaptive antennas. In this regard, the base station and mobile stations may comprise a plurality of wireless interfaces for communication tasks such as device discovery, initial connection, security operations, application operations, location determination enablement and location information sharing for example.

In some embodiments of the invention, antenna arrays may be utilized that enable beamforming such as in phased arrays, for example, to modify the direction of transmission and/or reception. Beamforming may be based on improving signal to noise ratio (SNR) and/or received signal strength. Accordingly, signal processing may be utilized to adjust the amplitude and/or phase of signal components and therefore modify beam or sensitivity direction via the antenna array. Adaptive beamforming may enable modification of the beam direction according to perceived varying spatial relationships between wireless devices. In some aspects of the invention, switched beamforming may be utilized. In this regard, the direction of radiation may be switched through a plurality of fixed beam patterns.

FIG. 1A is a block diagram that illustrates an exemplary system for 60 GHz antenna adaptation and user coordination based on base station beacons, in accordance with an embodiment of the invention. Referring to FIG. 1A, there is shown two wireless devices, a base station 102 and a mobile station 104. The two wireless devices 102 and 104 may each comprise at least a processor block 112, a memory block 114, a 60 GHz block 110a and antenna interfaces 116 and 118 respectively. In addition, the base station 102 and mobile station 104 may each comprise one or more of a wireless local area network (WLAN) block 110b, a wireless personal area network (WPAN) block 110c, and/or a global positioning system (GPS) receiver 110d. The base station 102 and mobile station 104 are not limited to these specific wireless technology interfaces and may comprise any suitable wireless interface, for example, any type of cellular and/or WIMAX technologies may be utilized.

The base station 102 and mobile station 104 may comprise suitable logic, circuitry and/or code that may enable wireless communication via one or more of the wireless interfaces 60 GHz 110a, WLAN 110b, WPAN 110c and/or GPS receiver 110d. For example, the highly directional 60 GHz interface 110a may be utilized for location determination operations and or data transfer. Communications via one or more of the lower frequency band interfaces, for example, WLAN 110b and/or WPAN 110c may enable tasks such as device discovery, connection initiation, security operations, data transfer, service coordination and/or location determination for example. In some embodiments of the invention, the base station 102, may control and coordinate operations among one or more mobile stations such as mobile station 104. For example, the base station 102 may communicate mobile station position information to one or more mobile stations that may enable mobile stations to adapt antennas for highly directional 60 GHz communications.

The base station 102 and/or mobile station 104 may not be limited with regard to any specific software application. For example, the 60 GHz wireless interfaces 110 may be utilized for high speed multi-user video gaming or video streaming and the base station 102 and/or mobile station 104 may comprise video displays. In addition, the mobile station 104 and/or base station 102 may enable internet access for browsing, gaming, data retrieval and/or voice over internet protocol (VOIP). The wireless multimode devices 102 and/or 104 may enable wireless phone connections, for example.

The base station 102 may be a stand-alone stationary device or may be substantially the same as or similar to the mobile station device 104. In some embodiments of the invention, the base station 102 may be incorporated into a device such as a set-top box, a home gateway or gaming console for example. Moreover, the base station 102 may act as a residential gateway and may connect to the internet or another network via a line and/or wireless connection. Furthermore, the base station 102 may comprise suitable logic, circuitry and or code to transmit a beacon signal via the 60 GHz link 110a or via a lower frequency wireless interface for example WLAN 110b or WPAN 110c.

The processor blocks 112 may comprise suitable logic, circuitry and or code to enable a plurality of tasks for the base station 102 and mobile station 104. For example the processor block 112 may enable location determination tasks that may comprise processing spatial information and mapping mobile station positions. The processor block 112 may enable coordination of communication operations for one or more mobile stations 104. Antenna management and signal processing, for example beamforming, may be enabled within the processor block 112. In addition, the processor block 112 may enable applications operations, for example, gaming or digital image rendering processes. In this regard, the processor block 112 may comprise one or more general purpose processors and/or one or more special purpose processors. The processor block 112 may be communicatively coupled to the memory block 114, the antenna block 116 or 118, the 60 GHz block 110a, WLAN block 110b, WPAN block 110c and or the GPS receiver 110d.

The memory blocks 114 may comprise suitable logic, circuitry and or code to store and retrieve data for the base station 102 and mobile station 104. In addition to supporting communications, gaming and/or image processing operations, the memory block 114 may support location determination operations. The memory block 114 may be communicatively coupled with the processor block 112, the antenna block 116 or 118, the 60 GHz block 110a, WLAN block 110b, WPAN block 110c and or the GPS receiver 110d.

The antenna block 116 in the base station 102 may comprise suitable logic, circuitry and or code to enable transmission and/or reception of signals between the base station 102 and one or more mobile stations such as mobile station 104. The antenna block 116 may comprise one or more antenna elements and/or antenna arrays. In this regard, beamforming via adaptive signal processing and/or beam switching may be utilized for 60 GHz communications. Antennas may be wide band and/or narrow band and may vary with respect to radiation pattern according to the needs of a specific design. In addition, the antenna block 116 may enable transmission of a pilot or beacon signal which may be radiated in an omni directional pattern or may be radiated in a directional pattern and may be swept through an angle over azimuth or altitude for example. In this regard, the beacon may be transmitted on the 60 GHz wireless interface 110a or on a lower frequency interface such as WLAN 110b or WPAN 110c via a 2.4 GHz or 5 GHz band carrier for example. The antenna block 116 may be communicatively coupled with the 60 GHz block 110a, the WLAN block 110b, the WPAN block 110c, the GPS receiver 110d and/or any other wireless transceiver suitable for the base station 102. In addition, the antenna block 116 may be communicatively coupled with the processor block 112 and the memory block 114.

The antenna block 118 in the mobile station 104 may comprise suitable logic, circuitry and or code to enable transmission and/or reception of signals between the mobile station 104 and the base station 102 as well as between two or more mobile stations such as the mobile station 104. The antenna block 118 may comprise one or more antenna elements and/or antenna arrays and may enable beamforming for example via adaptive signal processing or beam switching for 60 GHz communications between two or more mobile stations and/or between a mobile station and a base station 102. Antennas may be wide band and/or narrow band and may vary with respect to radiation pattern according to the needs of a specific design. In addition, the antenna block 118 may enable reception of a pilot or beacon signal from the base station 102. The pilot signal may be received via an omni directional pattern antenna or a directional pattern antenna as well as an antenna enabled to adapt to varying signal direction. In this regard, the beacon may be received on the 60 GHz wireless interface 110a or on a lower frequency interface such as WLAN 110b or WPAN 110c via a 2.4 GHz or 5 GHz band carrier for example. The antenna block 118 may be communicatively coupled with the 60 GHz block 110a, the WLAN block 110b, the WPAN block 110c, the GPS receiver 110d and/or any other wireless transceiver suitable for the mobile station 104. In addition, the antenna block 118 may be communicatively coupled with the processor block 112 and the memory block 114 within the mobile station 104.

The 60 GHz physical interface 110a may comprise suitable logic, circuitry and/or code to enable communications within a local region relative to the base station 102 and mobile station 104. The 60 GHz interface may, for example, enable local file transfers, video connections and/or high speed gaming for one or more users. The 60 GHz block may comprise a physical layer interface or a physical layer interface and a medium access control (MAC) layer. 60 GHz signals may be transmitted short distances, point to point, in a highly directional radiating pattern. In addition, the 60 GHz interface 110a may enable location determination operations for the base station 102 and/or the mobile station 104. In addition, the 60 GHz physical interface may support high speed data transfer via an ultra wide band (UWB) technology for example, or other wireless technologies.

The wireless local area network (WLAN) block 110b may comprise suitable logic, circuitry and or code to enable communications within a local region relative to the base station 102 and mobile station 104. The WLAN block 110b may support an IEEE 802.11 physical layer (PHY) or a PHY and a media access control (MAC) layer. In addition, the WLAN block 110b may operate on a lower portion of spectrum, for example, near 2.4 GHz and/or 5 GHz for example. The WLAN block 110b may be utilized to communicate and/or retrieve data from a computer or network, for example video and/or audio data. Moreover, the WLAN block 110b may be utilized to access the internet for retrieval of audio/video data, web surfing and/or voice over IP for example. In some embodiments of the invention, the WLAN may be utilized to support location determination by sharing geo-location information obtained via the 60 GHz block 110a and/or GPS block 110d with one or more devices.

The wireless personal area network (WPAN) block 110c may comprise suitable logic, circuitry and or code to enable communications within a local region relative to the base station 102 and/or 104. The WPAN block 110c may comprise for example, a Bluetooth transceiver comprising a physical layer interface or a physical layer interface and a medium access control (MAC) layer. The WPAN block 110c may support operations in the 2.4 GHz and/or 5 GHz frequency bands or may operate in other suitable spectrum. The WPAN block 110c is not limited with regard to wireless technologies and may, for example, support frequency hopping or UWB technology capable of high speed file transfer such as Wimedia. The WPAN block 110c may enable device discovery, security operations and/or general administrative activity among the base station 102 and mobile station 104. The WPAN block 110c may be communicatively coupled with the processor block 112, the memory block 114 and/or the antenna blocks 116 and/or 118.

The GPS block 110d may comprise suitable logic, circuitry and or code to enable communications with Global Positioning System (GPS) satellites. The GPS block 110d may comprise a GPS receiver enabling reception of spread spectrum signals carrying information that enables clock synchronization and/or coarse position determination for civilian applications or more precise position determination for military applications. GPS information comprising satellite position, current time and measured delay of the received signal, may be utilized to calculate a position fix for the base station 102 and/or the mobile station 104. Position errors caused by atmospheric conditions, multi-path signals, clock errors and other physical conditions may be processed for improved accuracy. The GPS block 110d may be communicatively coupled with the processor block 112, the memory block 114 and the antenna block 116 and/or 118.

In operation, the base station 102 and mobile station 104 may communicate via multiple wireless interfaces comprising a 60 GHz interface 110a and one or more lower frequency wireless interfaces 110b and/or 110c. Moreover, the base station 102 and/or one or more mobile stations may communicate via adaptive antennas. The 60 GHz block 110a, WLAN block 110b, WPAN block 110c and/or the GPS block 110d may enable location determination operations. In this regard, the 60 GHz block 110a may improve the precision of location information that may be based on lower bandwidth measurements. In addition, high speed data transfer, for example audio and/or video data, may be transmitted between the base station 102 and mobile station 104 or between two or more mobile stations such as mobile station 104 via the 60 GHz physical interface 110a.

The lower frequency interfaces, for example WLAN 110b and/or WPAN 110c, may be utilized to enable application and communication operations among the base station 102 and mobile station 104. For example, lower frequency interfaces may be utilized to transfer data with regard to security and/or coordination among devices. A WPAN interface 110c may, for example, enable discovery of devices within a local region. A WLAN interface 110b may, for example, enable sharing of location determination information among devices. In addition, the lower frequency interfaces WLAN 110b and/or WPAN 110c may enable location determination of mobile stations. In this regard, location information gathered via the lower frequency interfaces WLAN 110b and/or WPAN 110c interfaces for example, may be utilized to aid in establishing highly directional 60 GHz connections via adaptive antennas between the base station 102 and mobile station 104 or between two or more mobile stations 104. In another aspect of the invention, the WLAN physical interface 110b and/or WPAN 110c interfaces may be utilized by applications running on the base station 102 to distribute information retrieved from a network.

The base station 102 and/or mobile station 104 may be utilized in a plurality of applications that may comprise multi-user high speed wireless gaming and/or audio/video wireless data transfer and rendering for example. The invention is not limited with regard to specific applications and the base station 102 and/or mobile station 104 may support a plurality of applications.

Figure 1B:
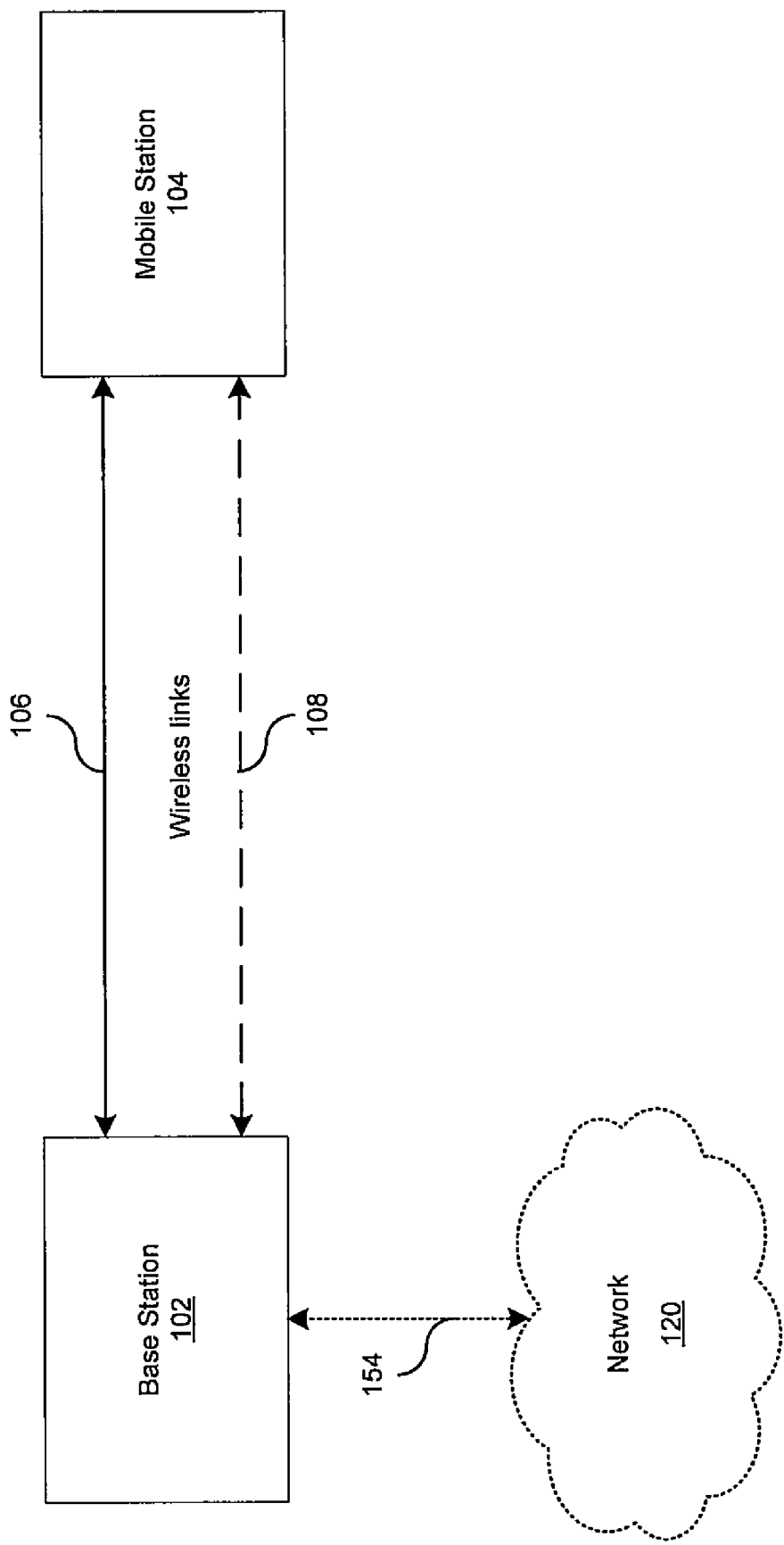
FIG. 1B is a block diagram that illustrates an exemplary wireless base station and mobile station communicating via one or more wireless links comprising a 60 GHz wireless link and a plurality of lower frequency wireless links, in accordance with an embodiment of the invention.

FIG. 1B is a block diagram that illustrates an exemplary wireless base station and mobile station communicating via one or more wireless links comprising a 60 GHz wireless link and a plurality of lower frequency wireless links, in accordance with an embodiment of the invention. Referring to FIG. 1B, there is shown a base station 102 and mobile station 104, a lower frequency wireless link 106, a 60 GHz wireless link 108, an optional line or wireless communications link 154 and an optional network 120.

The base station 102 may be the same or similar to the base station 102 described in FIG. 1A. The base station 102 may comprise suitable logic, circuitry and/or code to enable wireless communication via one or more wireless interfaces as well as enable location determination of one or more mobile stations 104 via a 60 GHz wireless link 108 and/or a lower frequency wireless link 108. In addition, the base station 102 may be capable of receiving GPS information for location determination assistance. In one embodiment of the invention, the base station 102 may be connected to a line and/or wireless network 120 that may be, for example, the internet. Accordingly, the base station 102 may act as an access point and/or a gateway to a network for one or more local devices such as the mobile station 104. In addition, the base station 102 may serve as a coordinator and/or controller of operations in relation to one or more devices such as mobile station 104 and may change roles with another device such as the mobile station 104, wherein the other device becomes the coordinator and/or controller of operations. Moreover, the base station 102 may handle peer to peer relationships with one or more devices such the mobile station 104. The base station 102 may be a stationary unit or may be portable or mobile. In this regard, the base station 104 may be a stand alone unit or may, for example, be incorporated in a WLAN access point, a set top box, a game console, a computer, a video server or video recorder/player device.

The base station 102 may enable location determination for one or more devices such as the mobile station 104. In this regard, the base station 102 may transmit a 60 GHz pilot or beacon signal via the wireless link 108 to enable position measurements and/or location determination for one or more devices such as mobile station 104. The base station 102 may utilize wireless technologies on lower operating frequencies, for example, utilizing WLAN 110b or WPAN 110c via wireless link 106 to share location determination information with one or more devices such as mobile station 104. Moreover, the lower frequency link 106 may be utilized for device position measurements. In this regard, position measurements may be utilized to enable highly directional antenna orientation for 60 GHz transmissions between the base station 102 and mobile station 104 and/or between two or more mobile stations such as the mobile station 104.

The mobile station 104 may be the same or similar to the mobile station 104 described in FIG. 1A. The mobile station 104 may comprise suitable logic, circuitry and/or code to enable communication via one or more wireless links such as the 60 GHz wireless link 108 and/or the lower frequency link 106 and may utilize adaptive antennas. The mobile station 104 may enable location determination via the 60 GHz link 108 and/or one or more lower frequency links 106. In addition, the wireless mobile station 104 may be capable of receiving and processing GPS information for location determination assistance. In one embodiment of the invention, the mobile station 104 may receive coordination and/or control information from the base station 102. In some embodiments of the invention, the mobile station 104 may be enabled to change roles with base station 102 wherein mobile station 104 may become the coordinator and/or controller of operations among a plurality of devices. Moreover, the mobile station 104 may handle peer to peer relationships with one or more devices such as base station 102 and/or mobile station 104.

The mobile station 104 may enable location determination for base station 102 and/or one or more mobile stations 104. In this regard, the mobile station 104 may receive and/or may transmit a pilot or beacon signal via the 60 GHz wireless link 108 and/or the lower frequency link 106 to enable location determination. The mobile station 104 may utilize wireless technologies on lower operating frequencies for example WLAN or WPAN to share information for example information regarding discovery, location determination, security operations, application data, control and/or coordination information with base station 102 and/or other mobile stations such as mobile station 104.

The wireless link 106 may communicatively couple two or more wireless devices such as base station 102 and mobile station 104 and/or two or more mobile stations such as the mobile station 104. Accordingly, the base station 102 and mobile station 104 may comprise suitable logic, circuitry and/or code to generate the lower frequency link 106. Accordingly, the wireless link 106 may be enabled to share data, perform discovery, initiate connections and/or facilitate operations for example. Moreover, the lower frequency link may comprise suitable logic, circuitry and/or code to transmit and/or receive a pilot or beacon signal between the base station 102 and/or mobile station 104. The wireless link 106 may support lower frequencies than the 60 GHz link 108, for example 2.4 GHz and/or 5 GHz and may be communicatively connected with the WPAN 110c and/or WLAN 110b interfaces for example. However, the invention is not limited with regard to specific carrier frequencies and any suitable frequency may be utilized. These lower frequency wireless links 106 may be radiated in a directional pattern, a broad-angle pattern or even in an omni directional pattern and may be scanned over an angle for example. Achievable transmission distance or range, supported by the lower frequency wireless link 106, may vary depending on a plurality of factors comprising carrier frequency, wireless technology, radiating power as well as physical environment (for example, an interior space versus an exterior space). Ranges may vary from approximately 10 m to over 100 m. In some embodiments of the invention, ultra-wideband (UWB) technology may be utilized for short range communications among the base station 102 and one or more mobile stations 104. Accordingly, UWB links may support high speed data transfers. Moreover, worldwide interoperability for microwave access (WIMAX) or various other cellular connections may be utilized and may enable longer range communications.

The 60 GHz wireless link 108 may communicatively couple two or more wireless devices such as base station 102 and mobile station 104 and/or between two or more mobile stations such as the mobile station 104. Accordingly, the base station 102 and mobile station 104 may comprise suitable logic, circuitry and/or code to generate the 60 GHz wireless link 108. Moreover, the 60 GHz link 108 may be communicatively connected with the 60 GHz interface 110a in the base station 102 and/or mobile station 104 for example. The 60 GHz wireless link 108 may be enabled to support location determination operations, video streaming, high speed video for multi-user gaming connections and/or high speed data transfers between base station 102 and mobile station 104 and/or between two or more mobile stations such as the mobile station 104. Accordingly, the 60 GHz wireless links may be radiated in highly directional patterns over short ranges. In some embodiments of the invention, adaptive antenna arrays or other intelligent antenna technologies may be utilized for transmitting and/or receiving the 60 GHz link within the base station 102 and/or one or more mobile stations 104.

Highly directional 60 GHz transmissions may comprise point to point communication between two devices such as between participating devices such as two mobile stations 104 or between the base station 102 and mobile station 104. In this regard, a participating device may have or gain knowledge of the relative positions or absolute locations of one or more other devices participating in the communication. In another embodiment of the invention, the 60 GHz wireless link 108 may support location determination operations. In this regard, the 60 GHz wireless link may for example be utilized to transmit and receive a pilot or beacon signal. The pilot or beacon signal may radiate in a stationary pattern or, the direction of radiation may be varied, for example, may be swept over an angle for example.

The network 120 may be a private, public or ad hoc network for example that may support applications running on the base station 102 and/or mobile station 104. The network 120 may comprise suitable logic, circuitry and or code to handle data that may be utilized by one or more of the base station 102 and mobile station 104. For example, audio and/or video (AN) data may be transferred to one or more of the base station 102 and mobile station 104 from the network 120 and may be rendered. The network 120 may be communicatively coupled with the base station 102 via the communications link 154. The communications link 154 may comprise suitable logic, circuitry and/or code that may enable the transfer of data between the base station 102 and the network 120. Accordingly, any suitable communications network technology and communications protocol may be utilized.

In operation, the base station 102 and mobile station 104 may communicate via a plurality of wireless interfaces such as 60 GHz 110a, WLAN 110b and/or WPAN 110c and over a plurality of wireless links 60 GHz link 108 and lower frequency link 108. In this regard, high bandwidth, highly directional, short range tasks such as location determination and high speed data transfers may be enabled via the 60 GHz wireless link 108. Moreover tasks supporting the 60 GHz wireless link 108, for example, sharing location information and other administrative tasks such as device discovery, connection initiation and security operations may be enabled via the lower frequency wireless link 106.

Upon receiving a request for service, the base station 102 may utilize a lower frequency wireless link 106 to enable discovery of devices within a local region. In addition, a lower frequency wireless link 106 may enable connection and security communications for the base station 102 and/or mobile station 104 via WPAN 110c and/or WLAN 110b wireless interfaces for example. Moreover, software and/or information regarding one or more applications running on the base station 102 and/or mobile station 104 may be received by the base station 102 from the network 120 via the communications link 154 and may be distributed via the lower frequency wireless link 106 to mobile station 104 for example. The 60 GHz link 108 may be utilized to enable location determination with an improved level of precision and may enable high speed communications between the base station 102 and mobile station 104 or between two or more mobile stations such as the mobile station 104. In some embodiments of the invention, an initial reference position for one or more devices may be known based upon GPS information or another source of location information such as user configuration data for example. Subsequently, a position for the base station 102 and/or one or more mobile stations 104, within a local region may be determined relative to one or more known reference positions. Millimeter waves from the 60 gigahertz physical interface 110a may be used to augment GPS or other position information and may improve precision of position measurements. Furthermore, antenna arrays or directional antennas that may be swept over an angle may be utilized to support angle of arrival and or time of arrival measurements.

Figure 2A:
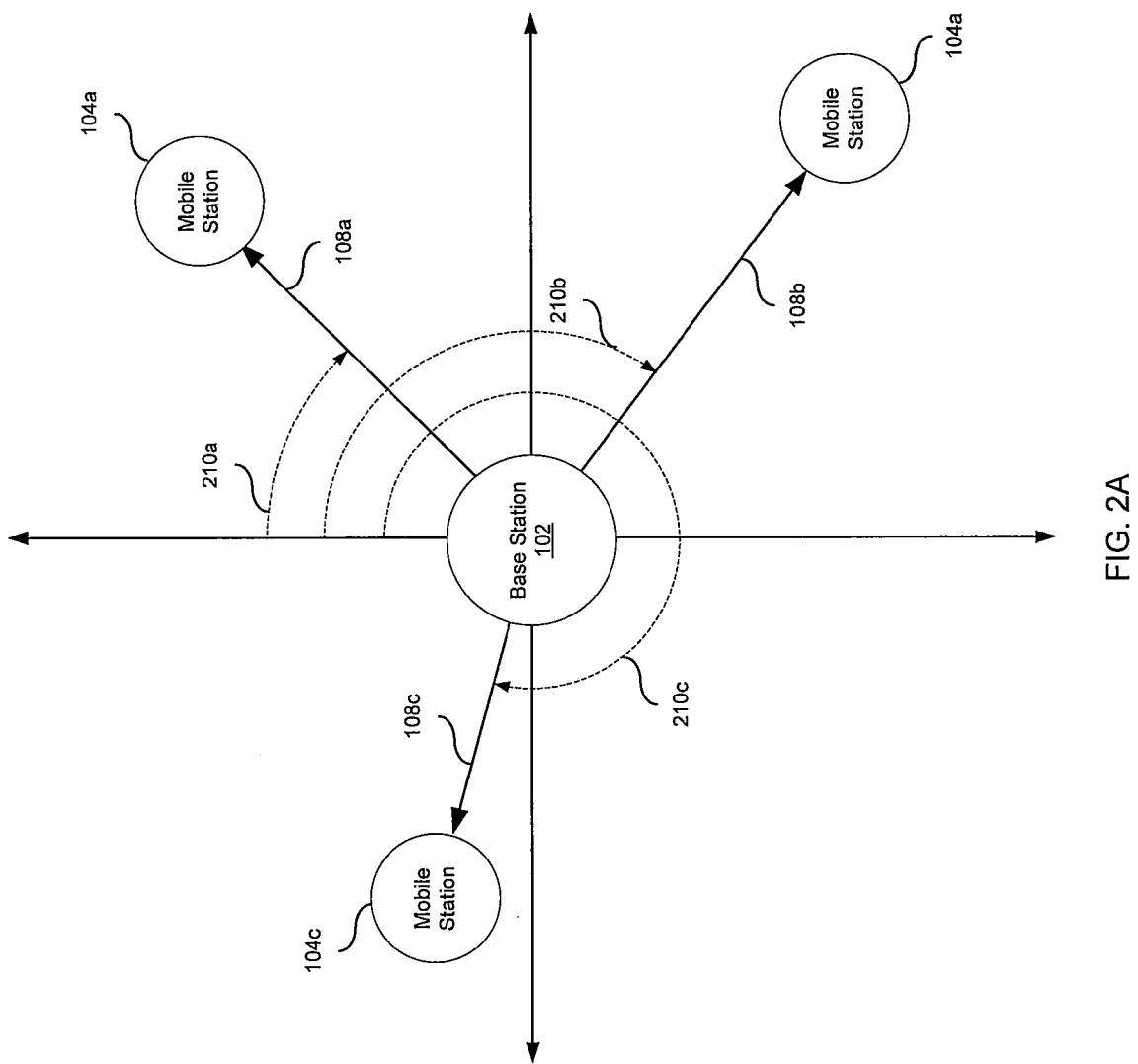
FIG. 2A is a block diagram that illustrates an exemplary system that may perform location determination measurements via one or more 60 GHz wireless links and/or one or more lower frequency links, in accordance with an embodiment of the invention.

FIG. 2A is a block diagram that illustrates an exemplary system that may perform location determination measurements via one or more 60 GHz wireless links and/or one or more lower frequency links, in accordance with an embodiment of the invention. Referring to FIG. 2A, there is shown a base station 102, a plurality of mobile stations 104a, 104b 104c, a plurality of wireless links 108a, 108b and 108c and a plurality of angles 210a, 210b, 210c.

The base station 102 may be similar or substantially the same as the base station 102 described in FIGS. 1A and 1B. The mobile stations 104a, 104b and 104c may be similar or substantially the same as the mobile station 104 in FIGS. 1A and 1B.

The wireless links 108a, 108b and 108c may be similar to or substantially the same as the 60 GHz link 108 described in FIG. 1B and/or the lower frequency link 106 described in FIG. 1B. The wireless links 108a, 108b and/or 108c may be communicatively coupled with the mobile stations 104a, 104b and/or 104c respectively and the base station 102 and may be enable a pilot or beacon signal between the base station 102 and the mobile stations 104a, 104b and/or 104c. In some embodiments of the invention, the pilot or beacon signal may be swept over an angle around the base station 102, spanning an arc that originates from a determined reference point or direction. In this regard the wireless links 108a, 108b and 108c may indicate an angle at which the one or more mobile devices 104a, 104b and 104c receive the pilot or beacon signal.

The angles 210a, 210b and/or 210c may be angles measured between the determined reference point or direction and a wireless link 108a, 108b and/or 108c. The angles 210a, 210b and/or 210c may indicate a line on which the mobile stations 104a, 104b and/or 104c may be located in relation to the base station 102.

In operation, the base station 102 may for example function as control and coordination device for one or more participating mobile stations 104a, 104b and/or 104c. The base station 102 may for example, coordinate location determination operations for the one or more mobile stations 104a, 104b and/or 104c. In this regard the base station 102 may calculate positions and/or may generate maps of participating device positions. In some embodiments of the invention, the base station 102 may utilize location information received from other internal or external sources such as a compass, the GPS system, a terrestrial reference system, user configuration data and/or other suitable sources. The base station 102 and/or mobile stations may map device positions according to any suitable coordinate system, for example, polar coordinates or Cartesian coordinates may be utilized depending on time or spatial references available to the system. The base station 102 and/or mobile stations 104a, 104b and/or 104c may share information regarding location determination via a 60 GHz link 108 and/or a lower frequency link 106 as described in FIG. 2A. Furthermore, information regarding the positions of the base station 102 and/or the one or more mobile stations 104a, 104b and/or 104c may be utilized to enable adaptive antenna orientation processes for communication via the 60 GHz links 108 of the participating devices.

A pilot or beacon signal between the base station 102 and one or more mobile stations 104a, 104b and/or 104c may be utilized to measure the angle subtended by an arc between a reference direction and the direction of the wireless links 108a, 108b and/or 108c at the time of reception of the pilot or beacon signal.

Figure 2B:
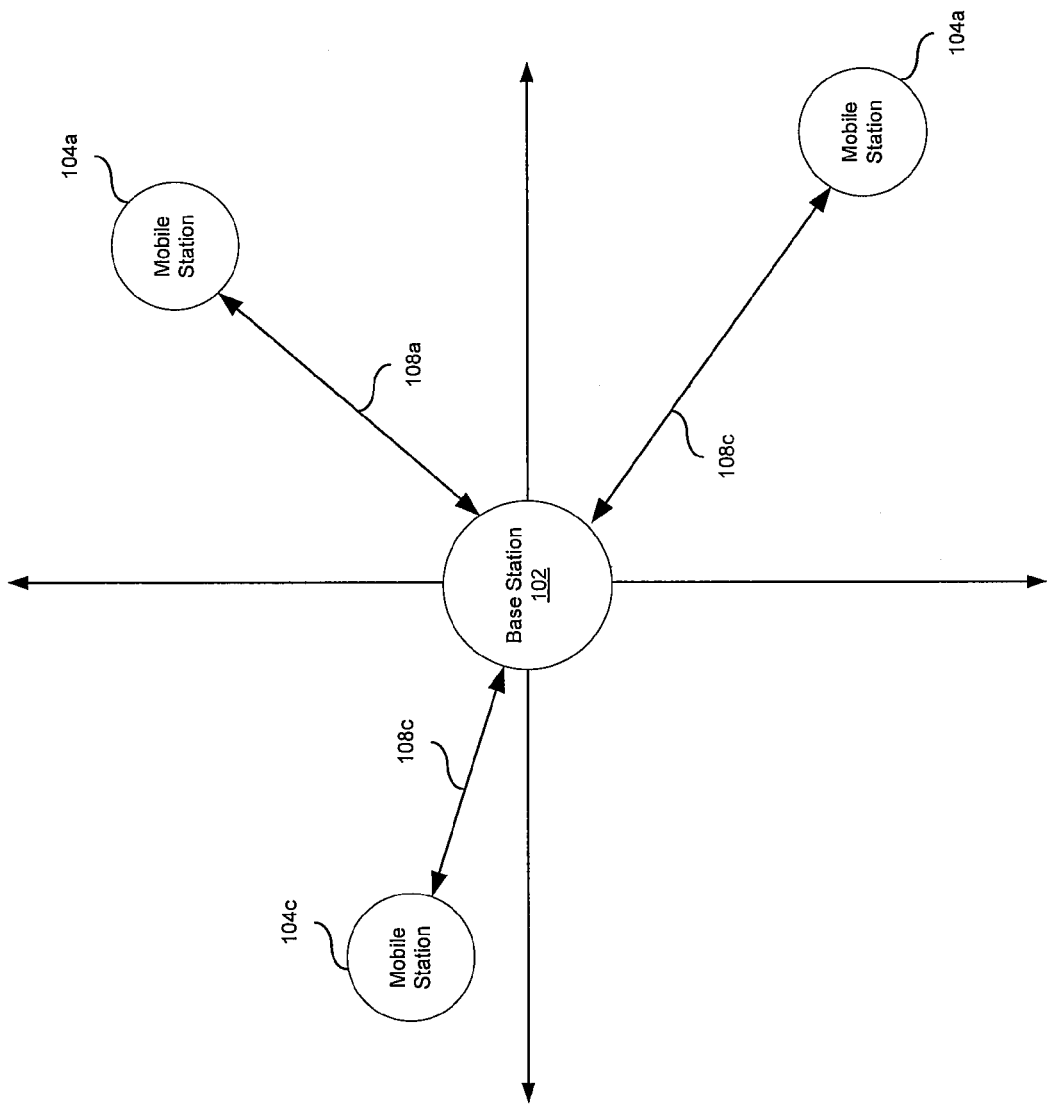
FIG. 2B is a block diagram that illustrates an exemplary system that may perform location determination measurements via one or more 60 GHz wireless links and/or one or more lower frequency links, in accordance with an embodiment of the invention, in accordance with an embodiment of the invention.

FIG. 2B is a block diagram that illustrates an exemplary system that may perform location determination measurements via one or more 60 GHz wireless links and/or one or more lower frequency links, in accordance with an embodiment of the invention. Referring to FIG. 2B, there is shown a base station 102, a plurality of mobile stations 104a, 104b 104c and a plurality of wireless links 108a, 108b and 108c.

The base station 102 may be similar or substantially the same as the base station 102 described in FIGS. 1A, 1B and 2A. The mobile stations 104a, 104b and 104c may be similar or substantially the same as the mobile stations 104, 104a, 104b and 104c described in FIGS. 1A, 1B and 2A.

The wireless links 108a, 108b and 108c may be similar to or substantially the same as the wireless links 106, 108, 108a, 108b and 108c described in FIGS. 1B and 2A.

In addition to the operations described in FIG. 2A, the wireless links 108a, 108b and/or 108c may be utilized to determine a relative distance from the base station 102 and one or more mobile stations 104a, 104b and 104c. In this regard, a signal that may be a pilot or beacon or may be another communication signal between the base station 102 and one or more mobile stations 104a, 104b and/or 104c may be utilized to measure the time delay from the base station 102 and one or more mobile stations 104a, 104b and/or 104c. In this regard, a round trip delay time or time of arrival may be measured. The measurements may be referenced to a shared time reference, for example, from the GPS system or a terrestrial reference system for example. The distance information may be utilized to enhance the mapping of devices as described in FIG. 2A.

Figure 2C:
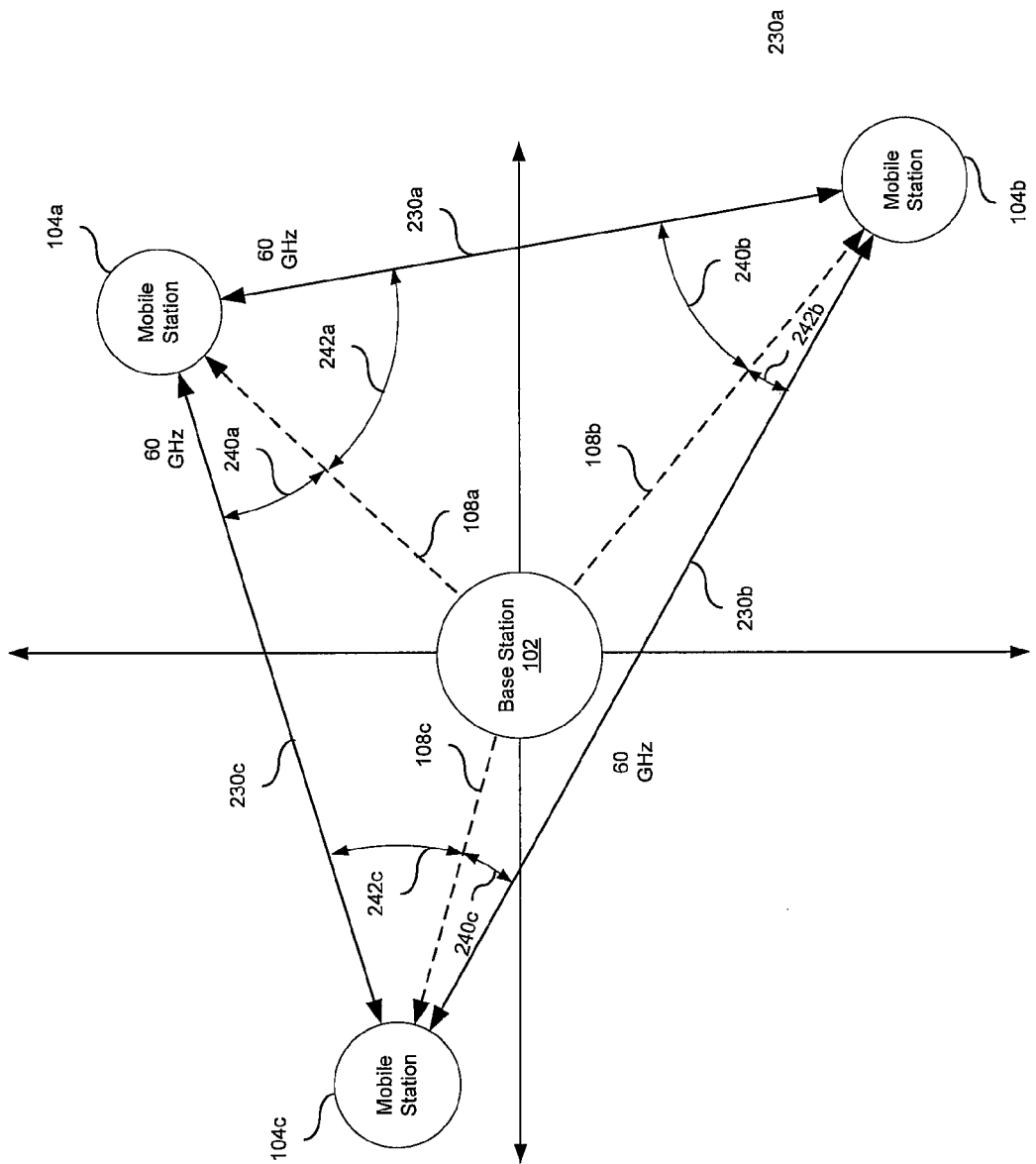
FIG. 2C is a block diagram that illustrates an exemplary system that may communicate via one or more 60 GHz wireless links via highly directional adaptive antennas, in accordance with an embodiment of the invention.

FIG. 2C is a block diagram that illustrates an exemplary system that may communicate via one or more 60 GHz wireless links via highly directional adaptive antennas, in accordance with an embodiment of the invention. Referring to FIG. 2C, there is shown a base station 102, a plurality of mobile stations 104a, 104b 104c and a plurality of wireless links 108a, 108b and 108c, a plurality of 60 GHz links 230a, 230b and 230c and a plurality of angles 240a, 242a, 240b, 242b, 240c and 242c.

The base station 102 may be similar or substantially the same as the base station 102 described in FIGS. 1A, 1B, 2A and 2B. The mobile stations 104a, 104b and 104c may be similar or substantially the same as the mobile stations 104, 104a, 104b and 104c described in FIGS. 1A, 1B, 2A and 2B. The wireless links 108a, 108b and 108c may be similar to or substantially the same as the wireless links 106, 108, 108a, 108b and 108c described in FIGS. 1B, 2A and 2B.

The angles 240a, 242a, 240b, 242b, 240c and 242c may enable location determination of the mobile stations 104a, 104b and/or 104c relative to each other. These angles may be determined from angle and time measurements described in FIGS. 2A and/or 2B as well as from other sources of location and/or time reference information described in FIGS. 2A and 2B. The angles 240a, 242a, 240b, 242b, 240c and 242c are shown in FIG. 2C on a two dimensional plane however angles in a third dimension or other coordinate systems may be determined and utilized. Accuracy of the of determined relative positions of the mobiles stations may depend on variables such as the directivity of the antennas utilized, the bandwidth of the signals utilized and the synchronization of a time reference.

The 60 GHz links 230a, 230b and 230c may be similar or substantially the same as the 60 GHz links 108, 108a, 108b and 108c described in FIGS. 1B, 2A and 2B however, 60 GHz links 230a, 230b and 230c may be transmitted and received between mobile stations 104a, 104b and/or 104c. Moreover, the 60 GHz links may be transmitted via adaptive antennas that may modify the direction of transmission and/or reception according to variations in spatial relationships between among the mobile stations 104a, 104b and 104c.

In operation, the base station 102 and/or one or more of the mobile stations 104a, 104b and 104c may participate in communications via adaptive antennas over one or more 60 GHz wireless links 230a, 230b and 230c and 60 GHz links on 108a, 108b and/or 108c. The 60 GHz wireless links may comprise highly directional beams that may be difficult or time consuming to detect for antenna adaptation processes utilized among the participating devices. Prior knowledge of a general direction or bearing from one participating device to another, may reduce the time needed to detect signal sources and determine the direction for radiation intensity. Accordingly, the time to make a connection via the 60 GHz wireless links 230a, 230b and 230c as well as 60 GHz links on 108a, 108b and/or 108 may be improved. Therefore, estimated location information such as relative positions or directions from one participating device to another may be determined via the methods described in FIGS. 1A, 1B, 2A and 2B as well as for determining the angles 240a, 242a, 240b, 242b, 240c. The determined location estimations may be more or less accurate and precise depending on the quality of measurements and reference frames utilized. Accordingly, one or more of the base station 102 and mobile stations 104a, 104b and 104c may utilize the estimated location information to enable timely connections via the 60 GHz wireless links 230a, 230b and 230c and 60 GHz links on 108a, 108b and/or 108c. Furthermore, if a connection fails or is lost during communications, the process may repeat to determine a new position fix and subsequent wireless connection.

The invention is not limited to any specific number of base stations 102 and/or mobile stations 104 and may comprise any suitable number and combination thereof.

Figure 3:
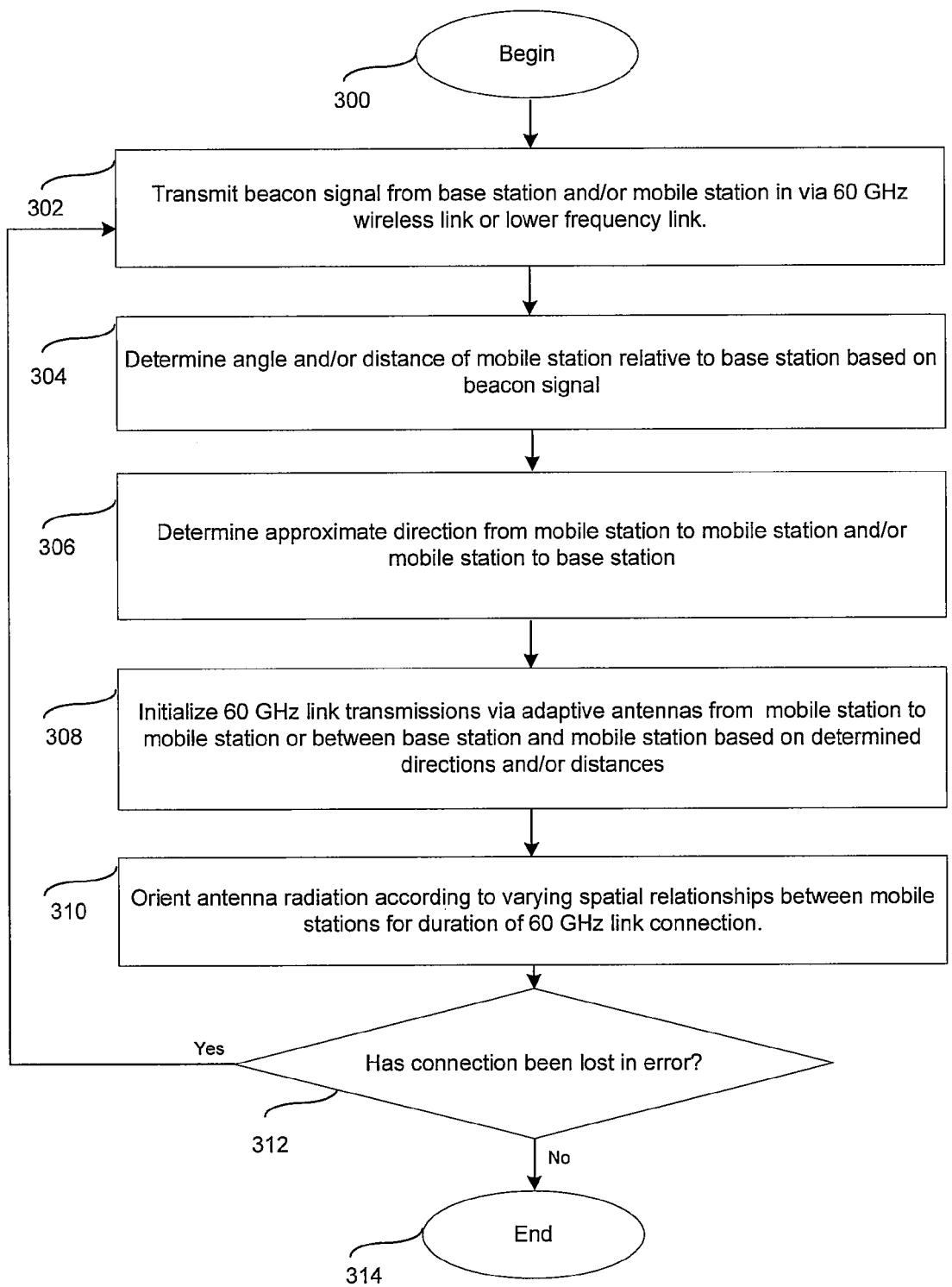
FIG. 3 is a flow chart that illustrates exemplary steps for location determination and antenna adaptation utilizing a 60 GHz wireless link, in accordance with an embodiment of the invention.

FIG. 3 is a flow chart that illustrates exemplary steps for location determination and antenna adaptation utilizing a 60 GHz wireless link, in accordance with an embodiment of the invention. Referring to FIG. 3, the process begins in step 300. In step 302, a beacon signal is transmitted via a 60 GHz link or lower frequency link, for example, wireless links 108a, 108b and/or 108c. In step 304, the direction and/or distance from of one or more mobile stations 104a, 104b and/or 104c relative to the base station 102 may be determined. In step 306, the direction and/or distance from one mobile to another mobile station may be determined. In step 308, the determined directions and/or distances may be utilized to inform antenna adaptation processes such as signal detection and/or direction of radiation that may be utilized for establishing connections via 60 GHz wireless links. In step 310, adaptive antennas may track the movements of radiation sources and/or radiation targets to maintain communications between two or more mobile stations such as 104a, 104b and 104c or with one or more base stations such as base station 102 until a connection is terminated. In step 312, if the connection has not been terminated due to error, the process may proceed to step 314. Step 314, is the end step. In step 312, if the connection has been terminated in error, proceed to step 302.

In an embodiment of the invention, information may be communicated between two or more wireless devices such as the mobile station 104 and/or the base station 102. Location information regarding the two or more wireless devices may be based on the transmission and reception or detection of a beacon signal. In this regard, the location information may enable communication between the two or more devices via adaptive or steered antennas or antenna systems 118 and/or 116 and 60 GHz band signals 108. The beacon signal may be swept through an angle such as 210a, 210b and/or 210c and may be utilized along with reference system information to determine the direction and/or distance between the two or more wireless devices. The determined direction and/or distance may be utilized to initialize adaptive or steered antennas or antenna systems 118 and/or 116 that enable transmission and/or reception of the 60 GHz band signals such as the wireless link 108. Spatial relationships between the two or more wireless devices may vary. Furthermore, the two or more wireless devices may communicate and coordinate communications between the two or more wireless devices via alternate lower frequency signals such as the wireless link 106.

Certain embodiments of the invention may comprise a machine-readable storage having stored thereon, a computer program having at least one code section for 60 GHz antenna adaptation and user coordination based on base station beacons, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for enabling communication between a plurality of devices, the method comprising:
in a 60 GHz communication system comprising a plurality of 60 GHz wireless devices that utilize adaptive or steered antennas or antenna systems for communication, communicating location information to at least one of said plurality of 60 GHz wireless devices via beacon signals to enable communication between said at least one of said plurality of 60 GHz wireless devices and at least one other of said plurality of 60 GHz wireless devices.

2. The method according to claim 1, comprising sweeping a direction of a beam comprising said beacon signal over one or more angles.

3. The method according to claim 1, comprising determining direction and/or distance between said plurality of 60 GHz wireless devices based on said beacon signals.

4. The method according to claim 3, comprising initializing said adaptive or steered antennas or antenna systems for transmission and/or reception of 60 GHz band signals based on said determined direction and/or distance between said plurality of 60 GHz wireless devices.

5. The method according to claim 1, comprising varying spatial relationships between said plurality of 60 GHz wireless devices.

6. The method according to claim 1, comprising communicating control information via an 802.11 WLAN, a Bluetooth WPAN and/or a Wimedia UWB between said plurality of 60 GHz wireless devices.

7. The method according to claim 1, comprising coordinating said communication between said plurality of 60 GHz wireless devices via an 802.11 WLAN, a Bluetooth WPAN and/or a Wimedia UWB.

8. The method according to claim 1, comprising communicating one or more of identity information, configuration information, timing information and spatial information via said beacon signals.

9. A system for communication between a plurality of devices, the system comprising:
in a 60 GHz communication system comprising a plurality of 60 GHz wireless devices that utilize adaptive or steered antennas or antenna systems for communication, one or more circuits that enable communicating location information to at least one of said plurality of 60 GHz wireless devices via beacon signals to enable communication between said at least one of said plurality of 60 GHz wireless devices and at least one other of said plurality of 60 GHz wireless devices.

10. The system according to claim 9, wherein said one or more circuits enables sweeping a direction of a beam comprising said beacon signal over one or more angles.

11. The system according to claim 9, wherein said one or more circuits enables determination of direction and/or distance between said plurality of 60 GHz wireless devices based on said beacon signals.

12. The system according to claim 11, wherein said one or more circuits enables initialization of said adaptive or steered antennas or antenna systems for transmission and/or reception of 60 GHz band signals based on said determined direction and/or distance between said plurality of 60 GHz wireless devices.

13. The system according to claim 9, wherein said one or more circuits enables variation in the spatial relationships between said plurality of 60 GHz wireless devices.

14. The system according to claim 9, wherein said one or more circuits enables communication of control information via an 802.11 WLAN, a Bluetooth WPAN and/or a Wimedia UWB between said plurality of 60 GHz wireless devices.

15. The system according to claim 9, wherein said one or more circuits enables coordination of said communication between said plurality of 60 GHz wireless devices via an 802.11 WLAN, a Bluetooth WPAN and/or a Wimedia UWB.

16. The system according to claim 9, wherein said one or more circuits enables communication of one or more of identity information, configuration information, timing information and spatial information via said beacon signals.

17. A machine-readable storage having stored thereon, a computer program having at least one code section for enabling communication between a plurality of devices, the at least one code section being executable by a machine for causing the machine to perform steps comprising:
   in a 60 GHz communication system comprising a plurality of 60 GHz wireless devices that utilize adaptive or steered antennas or antenna systems for communication, communicating location information to at least one of said plurality of 60 GHz wireless devices via beacon signals to enable communication between said at least one of said plurality of 60 GHz wireless devices and at least one other of said plurality of 60 GHz wireless devices.

18. The machine-readable storage according to claim 17, wherein said at least one code section comprises code that enables sweeping a direction of a beam comprising said beacon signal over one or more angles.

19. The machine-readable storage according to claim 17, wherein said at least one code section comprises code that enables determining direction and/or distance between said plurality of 60 GHz wireless devices based on said beacon signals.

20. The machine-readable storage according to claim 19, wherein said at least one code section comprises code that enables, initializing said adaptive or steered antennas or antenna systems for transmission and/or reception of 60 GHz band signals based on said determined direction and/or distance between said plurality of 60 GHz wireless devices.

21. The machine-readable storage according to claim 17, wherein said at least one code section comprises code that enables varying spatial relationships between said plurality of 60 GHz wireless devices.

22. The machine-readable storage according to claim 17, wherein said at least one code section comprises code that enables communicating control information via an 802.11 WLAN, a Bluetooth WPAN and/or a Wimedia UWB between said plurality of 60 GHz wireless devices.

23. The machine-readable storage according to claim 17, wherein said at least one code section comprises code that enables coordinating said communication between said plurality of 60 GHz wireless devices via an 802.11 WLAN, a Bluetooth WPAN and/or a Wimedia UWB.

24. The machine-readable storage according to claim 17, wherein said at least one code section comprises code that enables communicating one or more of identity information, configuration formation, timing information and spatial information via said beacon signals.

25. A method for enabling communication between a plurality of devices, the method comprising:
   in a 60 GHz communication system comprising a plurality of 60 GHz wireless devices that utilize adaptive or steered antennas or antenna systems for communication, receiving location information by at least one of said plurality of 60 GHz wireless devices via beacon signals to enable communication between said at least one of said plurality of 60 GHz wireless devices and at least one other of said plurality of 60 GHz wireless devices.

* * * * *